Feb. 25, 1969  L. J. HOFFMAN  3,429,291
DIFFERENTIAL-PRESSURE RESPONSIVE INDICATOR
Filed Feb. 16, 1965
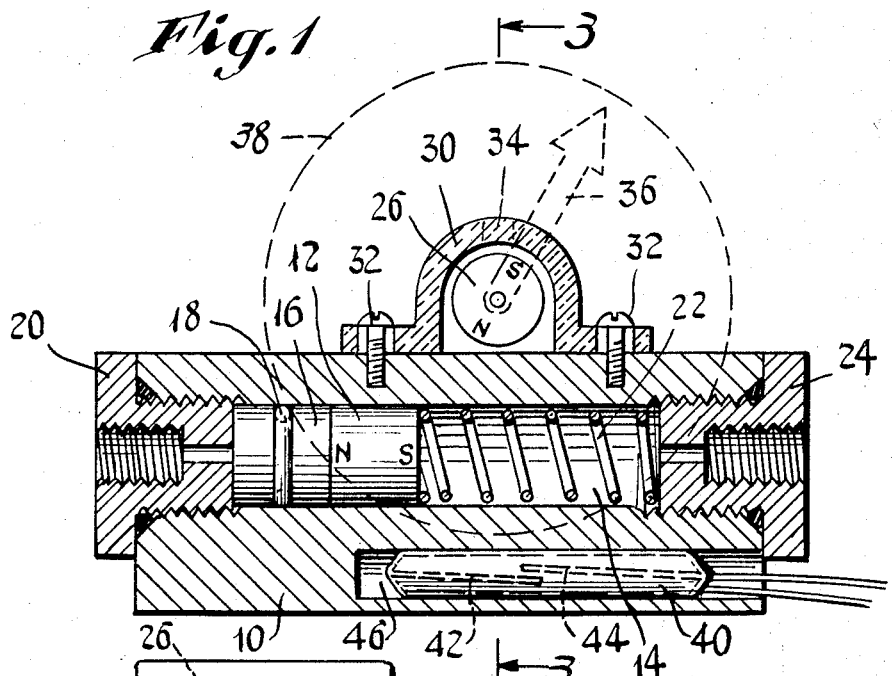
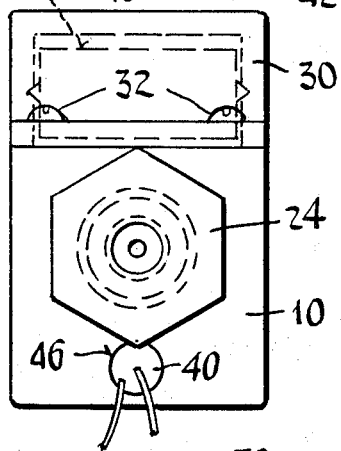
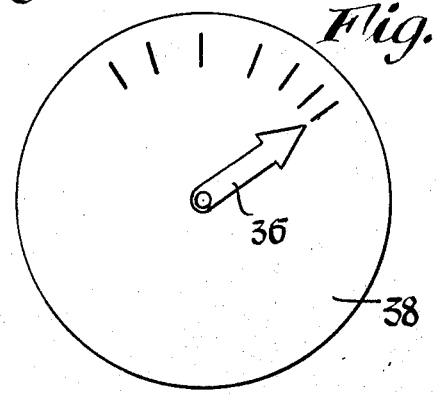
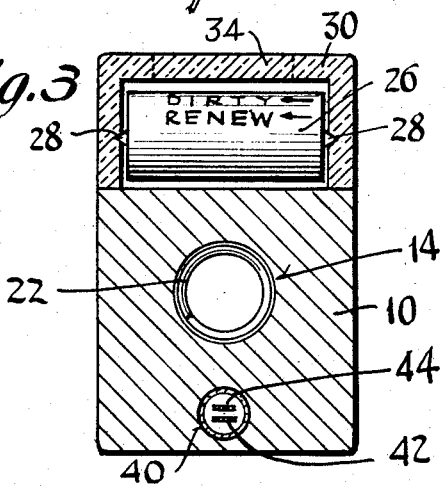
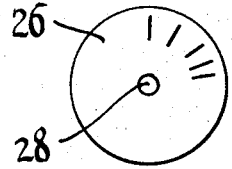
INVENTOR.
Leslie J. Hoffman
BY
H. Gibner Lehmann
AGENT

United States Patent Office 3,429,291
Patented Feb. 25, 1969

3,429,291
DIFFERENTIAL-PRESSURE RESPONSIVE INDICATOR
Leslie J. Hoffman, c/o Orange Research, 821 Derby-Milford Road, Orange, Conn. 06477
Filed Feb. 16, 1965, Ser. No. 433,103
U.S. Cl. 116—70     2 Claims
Int. Cl. G01l 19/12

ABSTRACT OF THE DISCLOSURE

A hydraulic differential-pressure indicator for connection to different points of a high-pressure, continuous flow hydraulic line to give easily recognized and read indications of small changes in pressure as caused by changes in rate of flow. A piston is acted on by opposing pressures from said different points, and can change its position in a cylinder. The piston has a permanent magnet which actuates a cooperable movable-magnet type indicator which is external to the cylinder and hydraulic system.

---

This invention relates to hydraulic differential-pressure indicators, and more particularly to indicators of this type, which utilize magnetic forces in effecting the readings.

An object of the invention is to provide a novel and improved hydraulic differential-pressure indicator which through the utilization of pivots and other allied structures and coupling means is especially sensitive and accurate in its response to pressure variations.

Another object of the invention is to provide an improved differential-pressure indicator as above set forth, which is particularly simple and economical in construction, while at the same time being foolproof, leakproof and reliable in operation.

A further object of the invention is to provide an improved hydraulic indicator in accordance with the foregoing, wherein reliable rotary (such as drum or dial type) indications are had.

A feature of the invention resides in the provision of a novel hydraulic indicator of the kind characterized, which is wholly leakproof even when high comparing-pressures are used, which is not likely to stick or jam, and wherein the indicating means is readily removable for inspection or replacement without disturbing the hydraulic system of the indicator.

Another feature of the invention resides in the provision of an improved indicator as above set forth, wherein relatively few parts are involved, such parts being easily fabricated and assembled from readily available materials and shapes.

A further and important feature of the invention resides in the provision of an indicator construction which enables scales having compressed portions to be employed, where such is desirable.

Other features of the invention reside in the small size and compactness of the indicator, the adaptability of the indicator for use with control devices such as electrical switches, as well as the flexibility which enables the indicator to be utilized for various different requirements and situations.

Other features and advantages will hereinafter appear.

In the drawings accompanying this specification, similar characters of reference are used to designate like components throughout the several views, in which:

FIG. 1 is an axial or longitudinal sectional view through the differential-pressure indicator device as provided by the invention.

FIG. 2 is a right-end elevational view of the indicator device.

FIG. 3 is a transverse section taken on the lines 3—3 of FIG. 1.

FIG. 4 is a plan view of a pointer and dial having scale portions compressed.

FIG. 5 is an end view of an indicator drum having a scale with compressed portions.

Referring now particularly to the figures, the indicator comprises a base member 10 on which there is reversibly movable a permanent magnet 12 in the form of a cylindrical plug having north and south poles at its end faces, as indicated.

Means are provided, responsive to hydraulic pressure differentials, for moving the permanent magnet 12 along a predetermined path of travel on the base, and in effecting this the base 10 is made tubular and the magnet 12 is carried in a cylindrical bore 14, in which there is also reversibly movable a piston element 16 having a resilient O-ring 18 to effect a seal with the side walls of the cylinder. The piston element 16 is shown as resting against a threaded pressure line end fitting 20 under the action of a return spring 22 which latter is also disposed in a cylinder bore 14. One end of the spring 22 engages an end of the permanent magnet 12 whereas the other end engages a second threaded line fitting 24 carried by the cylinder 10.

With such construction, fluid under pressure which is introduced into the cylinder 10 at the fitting 20 will tend to move the piston element 16 from left to right, and a lower pressure of fluid introduced into the fitting 24 will oppose such movement. Entering as a factor in this movement is the resistance of the spring 22, and it will be understood that the spring action tends to help the fluid pressure at the right of the piston element 16. Accordingly, a greater pressure of fluid introduced in the fitting 20 will shift the piston element 16 to the right until a balance is reached, wherein the combined resistance of the spring 22 and the lesser fluid pressure at the fitting 24 will be counterbalanced.

In accordance with this invention, the movement of the permanent magnet 12 in its predetermined path of travel as fixed by the bore 14 of the cylinder 10 is made cooperable with a rotary indicator member having sensitive pivots to effect an indication of the difference of the pressures of the fluid introduced at the fittings 20, 24, there being a notable absence of sliding friction of the indicating means. In conjunction with this, the utilization of magnetic forces and the provision of the imperforate tubular base or cylinder by which leakage is wholly eliminated, provide marked advantages in the present indicator.

It is noted that the pressure differential which exists will determine the exact placement of the piston 16 in the cylinder 10. Such position is indicated, in accordance with the invention, by means of a novel pivotally mounted or turnable indicator member having low-friction pivots and which is located so as to be wholly exterior to the cylinder bore 14, with no communication therewith.

As shown, the indicator member 26 is carried by a small diameter spindle or by pivots 28 mounted in a transparent housing 30 which in turn is secured, as by screws 32, to the exterior wall of the cylinder 10.

The axis of the pivots 28 is disposed transversely with respect to the axis of the cylinder 10, and the indicator member 26 is in FIGS. 1, 3 and 5 shown as having the form of a drum. If the indicator drum 26 is of permanent magnet material, it may be cross magnetized to provide poles as indicated, or else a separate permanent magnet member may be carried by the indicator drum 26 so as to present the north and south poles as shown.

Referring to FIG. 1, it will now be understood that the north pole of the indicator member 26 is attracted to the south pole of the permanent magnet 12 which is movable in the bore 14 of the cylinder 10. Also, as the permanent magnet 12 is shifted under the action of the piston element 16 and spring 22, the rotary indicator member 26 will turn, changing its rotative position. The cylindrical periphery or an end of the indicator member 26 may be provided with indicia, indicating various conditions, differential-pressure values, etc., and such indicia may be presented at a small semi-cylindrical window area indicated generally by the numeral 34. Thus, the positions and indications given by the indicator member 26 as viewed through the window 34 will be an indication of the magnitude of the pressure differential of the fluids introduced at the fittings 20, 24.

The present indicator device has utility in connection with oil filters and the like. By connecting pressure lines from the fittings 20, 24 to opposite sides of the oil lines of the filter, with the high pressure existing at the fiting 20, a clean filter providing for free flow of oil through it will result in a relatively small pressure differential at the fittings 20, 24. Accordingly, but little displacement of the piston 16 and permanent magnet 12 will occur, and only a small indicating movement of the indicator member 26 will take place. When the oil filtering element becomes dirty or clogged, the pressure at the fitting 24 will drop considerably, resulting in a shifting of the piston 16 from left to right, as well as a shifting of the permanent magnet 12. This will result in the indicator member 26 turning as the magnetic attraction causes it to respond to the different positions of the magnet 12. The turned positions of the indicating member 26 are visible through the window 34 and this, then, may be taken as an indication that the oil filter element has become dirty and clogged, and requires replacement.

It will be understood that in adidtion to the indicating window 34, the spindle 28 for the indicator drum 26 may pass through the housing 30 to carry an indicating arrow or pointer 36, adjacent a dial or scale 38. Thus, an indication may be had, using relatively large indicating means which are visible remote from the indicator.

For the purpose of effecting control of electrical equipment, a capsule type electrical switch 40 having one or several magnetically responsive switch elements 42, 44 may be mounted in a bore 46 of the base 10, where the switch elements will be influenced by the permanent magnet 12. Thus, as the magnet attains a particular position in the bore 14, the switch capsule 40 may be conditioned to close the circuit through the contacts 42, 44 thereof, for the purpose of sounding an alarm or operating other equipment.

The construction of the indicator device as illustrated herein is seen to be extremely simple, involving relatively few parts which may be economically fabricated and made from readily available shapes or stock already on the market. For example, the cylinder or base member 10 may be formed from aluminum bar stock of square or rectangular cross section whereby the flat sides will provide a convenience in mounting the indicator housing 30. The bar stock may be readily cut to the desired length, and thereafter bored to provide the cylinder bore 14, as will be readily understood. Bored enlargements may be provided at the ends of the cylinder 10, and internally threaded to accommodate the pressure fittings 20, 24. Standard fittings may thus be readily accommodated in the cylinder or base 10. Also, the bore 14 may be such as to take a standard size O-ring 18.

By positioning the magnetic indicator member 26 at various differential axial locations on the cylinder 10, an expanded or compressed scael effect may be had, as shown in FIGS. 4 and 5. For instance, it will be seen that if the housing 30 and indicator 26 are located to the right from the position shown, the initial movement of the indicator will be relatively slight and its final movement will be relatively great. A scale like that of FIG. 4 may result. Or, if the housing 30 is located from the shown position to a place more to the left, the initial movement of the indicator 26 will be greater and its final movements will be less as the piston element 16 moves from left to right. This would give a scale like that of FIG. 5. Under certain conditions it may be desirable to have a scale which is expanded or compressed at various points, and the present improved construction readily lends itself to such requirement. In this connection, referring to FIG. 1, it will be seen that if a graphic projection of the circular magnet 26 is made vertically downward to the axis or line of travel of the bar magnet 12, such projection would intersect the axis or the line of travel, along a segment of said line which is disposed wholly past the end of the bar magnet 12 (for the FIG. 1 position with the indicator member 36 pointing toward the right or located at one end of its scale). For such condition the north pole of the bar magnet 12 is seen to be substantially removed from the field of influence of the circular magnet means 26, insofar as effecting any deflection is concerned. If now the bar magnet 12 is shifted from left to right so that it is directly under the circular magnet means 26, thereby to occupy the line segment formed by the downward graphic projection of the magnet 26, the latter will have rotated counterclockwise and the pointer 36 will be disposed at the other end of its scale, pointing toward the left. For such condition the north pole of the bar magnet 12 will now have a significant influence on both poles of the circular magnet 26, with the result that this circular magnet will be turned a greater extent than otherwise and this will mean that the scale at its leftmost end as viewed in FIG. 1 will be somewhat expanded. It is to be noted that when the bar magnet 12 is directly below the circular magnet 26 the two north poles are repelling and also the north of the bar magnet is attracting the south pole of the circular magnet. This active influence which now comes into play, involving the otherwise inactive north pole of the bar magnet 12, involves the structural features and relationships of the magnets, including the two magnet diameters which are commensurate with each other and with the length of the bar magnet 12. Accordingly, this is an important feature of the present invention.

It will be seen that no communication exists whatsoever between the space surrounding the indicating member 26 and the bore 14 of the cylinder 10. Thus, there is no possibility whatsoever of leakage regardless of high hydraulic pressures which might exist in the cylinder 14. The only possible place for leakage is at the fittings 20, 24 and these may be securely sealed by the use of O-rings, bushings or washers and the like.

It will now be understood from the foregoing that I have provided a new and improved differential-pressure indicator which is compact and small in size, constituted of relatively few parts which may be readily economically fabricated and assembled, and which has the added advantage that in conjunction with the magnetic coupling by which leakage is wholly prevented the elimination of sliding friction in the indicator means results in a high degree of sensitivity and an accurate response to the various positions of the pressure responsive member or piston element 16. The entire instrument is not greatly larger in size than the diameters of the hydraulic pressure fittings which accommodate the hydraulic lines providing the pressure differtial. The indicator is, moreover, of rugged and footproof construction, and provides an extended useful life with a minimum of servicing required.

By making the housing holes for the screws 32 in the form of slots as shown in FIG. 1, an adjustable positioning of the housing 30 and indicator member 26 is had with respect to the magnet 12, thereby to effect an adjustment of the indication given by the member.

While an O-ring 18 is shown in the piston 16, such ring may be omitted if desired. Also, where the magnet 12 is a good sealing fit in the cylinder 10, it may be used without benefit of the piston 16, or may be interchanged with the piston to locate it further from the indicator member 26 for providing a different response of the latter.

Variations and modifications may be made within the scope of the claims, and portions of the improvement may be used without others.

I claim:
1. A differential-pressure indicator comprising, in combination:
   (a) a base,
   (b) a permanent bar magnet constituted as a solid cylinder having a diameter substantially equal to its axial length, said magnet having north and south poles at its opposite ends,
   (c) means mounting the bar magnet on the base to enable the magnet to be reversibly movable thereon along a predetermined linear path of travel substantially along its axis,
   (d) means on said base, responsive to hydraulic pressure differentials, for moving said permanent magnet along its axial path of travel,
   (e) a turnable indicator member and a scale therefor, said indicator member having a pivotal axis and a predetermined arcuate normal working range,
   (f) means pivotally mounting the indicator member for turning movement on the base about its pivotal axis and adjacent the linear path of travel of the said permanent magnet, said means locating said pivotal axis at one side of and spaced from the line defined by said linear path, and
   (g) a circular permanent magnet means connected with said indicator member and having diametric magnetization comprising two poles disposed respectively on opposite sides of the pivotal axis of the indicator member, said permanent magnet means coacting with said permanent magnet, thereby to cause the indicator member to turn in response to shifting of the said permanent magnet, said circular magnet means having a diameter of the same order of magnitude as the diameter and length of said cylindrical bar magnet,
   (h) the projection of said circular permanent magnet means on the line defined by said linear path constituting a segment of said line which is disposed past the end of the bar magnet when the indicator member is positioned at one end of its scale;
   (i) the pole of said bar magnet which is most remote from said line segment being substantially out of the field of influence of said circular permanent magnet means for the said poistioning of the indicator member,
   (j) said bar magnet moving toward and into said line segment to shift the indicator member along its scale, said bar magnet substantially coinciding with said line segment and simultaneously therewith said remote pole of the bar magnet having a substantial influence on both poles of said circular permanent magnet means when the said indicator member is positioned at the other end of the scale, thereby to effect a greater relative movement of the indicator member at said scale end whereby there is had an expanded characteristic for said other end of the scale.

2. The invention as defined in claim 1, wherein:
   (a) a housing is provided on the base, in which housing the cylindrical drum magnet means and indicator member are mounted,
   (b) said indicator member comprising outer portions of said cylindrical drum magnet means,
   (c) said housing having a semi-cylindrical transparent wall through which the indicator member may be viewed,
   (d) said housing being adjustably mounted on the cylinder to enable it to be shifted to different positions, thereby to adjustably locate the indicator member to effect an adjustment of the indications given thereby.

References Cited
UNITED STATES PATENTS

| | | | |
|---|---|---|---|
| 1,594,808 | 8/1926 | Anderson | 73—116 |
| 2,425,691 | 8/1947 | Brewer | 73—209 |
| 2,582,146 | 1/1952 | Moore | 73—419 |
| 2,674,121 | 4/1954 | Gorman | 73—407 |
| 3,164,989 | 1/1965 | Busillo et al. | 73—209 |
| 3,182,630 | 5/1965 | Claeys | 116—70 |
| 3,325,010 | 6/1967 | Sackett | 210—90 |
| 1,107,298 | 8/1914 | Haas | 73—419 |
| 1,499,839 | 7/1924 | Nicholson | 73—209 |
| 2,260,516 | 10/1941 | Gerber | 73—209 |
| 2,574,866 | 11/1951 | Fahrlander | 73—210 |
| 3,253,295 | 5/1966 | Waters | 116—114 XR |
| 3,333,564 | 8/1967 | Waters | 116—70 XR |

LOUIS J. CAPOZI, *Primary Examiner.*

U.S Cl. X.R.

73—205, 419; 210—90